(12) United States Patent
Droche

(10) Patent No.: US 6,871,730 B2
(45) Date of Patent: Mar. 29, 2005

(54) ROTATION-RETARDING DEVICE WITH DIRECT ENGAGEMENT

(75) Inventor: Emile Droche, La Garenne Colombes (FR)

(73) Assignee: I.T.W. de France, Beauchamp (FR)

(*) Notice: Subject to any disclaimer, the term of this patent is extended or adjusted under 35 U.S.C. 154(b) by 253 days.

(21) Appl. No.: 09/906,610

(22) Filed: Jul. 18, 2001

(65) Prior Publication Data
US 2002/0014726 A1 Feb. 7, 2002

(30) Foreign Application Priority Data
Aug. 4, 2000 (FR) .............................. 00 10343

(51) Int. Cl.⁷ ................................. E05D 11/10
(52) U.S. Cl. ................. 188/130; 188/83; 188/82.84
(58) Field of Search .................. 188/129, 130, 188/240–246, 306–310, 83, 82.1, 82.6, 82.8, 82.84; 207/140.12, 154, 153, 141.2, 279, 280, 281, 282; 16/222, 232, 255, 256, 257, 277, 303, 319

(56) References Cited

U.S. PATENT DOCUMENTS

| | | | |
|---|---|---|---|
| 1,808,700 A | 6/1931 | Wendell | 188/300 |
| 2,712,742 A | 7/1955 | Neidhart | 188/300 |
| 4,218,808 A | 8/1980 | Chu | |
| 4,794,669 A | 1/1989 | Sanders | |
| 4,845,809 A | 7/1989 | Pillifant, Jr. | |
| 5,178,481 A | 1/1993 | Kawamura | |
| 5,413,317 A | 5/1995 | Spoerre | |
| 5,582,276 A | 12/1996 | Berteau | 188/300 |

FOREIGN PATENT DOCUMENTS

| | | |
|---|---|---|
| DE | 1 230 682 | 6/1967 |
| DE | 205 573 | 12/1983 |
| DE | 240 583 | 11/1986 |
| DE | 0255879 | 2/1988 |
| DE | 37 25 356 | 2/1988 |
| DE | 40 23 978 | 6/1993 |
| FR | 2674588 | 10/1992 |
| GB | 698208 | 10/1953 |
| GB | 965868 | 8/1964 |
| GB | 1294843 | 11/1972 |
| GB | 2218777 | 11/1989 |
| GB | 2342120 | 2/1997 |

OTHER PUBLICATIONS

Schmierung polymerer Werkstoffe, Teil I: Thermoplaste, by Helmut Winkler, *Tribologie*, pp. 64, 67–69.
Elastomere Federung Elastische Lagerungen, by Von Walter Battermann et al, 1982, pp. 1–9.

Primary Examiner—Matthew C. Graham
(74) Attorney, Agent, or Firm—Lowe Hauptman Gilman & Berner, LLP

(57) ABSTRACT

The rotation-retarding device includes a first element and a second element having a rotary motion to be retarded relative to each other. The first element includes a block of flexible material (106), the second element (107) is able to locally deform the block of flexible material (106) throughout the rotary motion in order to retard this motion, and anti-adherence means are provided at the interface of the two elements. The block of flexible material (106) may also have a dimensional variation able to permit progressive retarding of the rotary motion.

6 Claims, 2 Drawing Sheets

ROTATION-RETARDING DEVICE WITH DIRECT ENGAGEMENT

TECHNICAL FIELD

Background Art

The present invention relates to a rotation-retarding device including a first element and a second element having relative to each other a rotary motion to be retarded.

Many elements, such as doors of washing machines or doors of motor vehicle glove compartments, have their opening controlled, for example by springs.

The displacement caused by the spring is generally sharply stopped by a stop. From this results more or less loud noise and violent shocks between the corresponding element and the stop.

Through French patent application 92-03741 is known a rotation-retarder by means of which the displacements of the elements, caused by the spring, are braked. This retarder includes a stator formed of two parts in the form of cups one of which fits over the other in order to form a housing in which an O-ring of elastic plastics material is arranged against the peripheral wall, while it surrounds a circular element of smaller diameter forming part of the rotor. Balls are arranged between the ring and the circular element which has notches in its periphery for this purpose. The rotary mounting of the rotor is effected by means of a small shaft which the stator includes at the centre of the housing, projecting from the bottom of the latter, the rotor piece of which the circular element forms part having in its centre a bore engaged on this shaft. This piece also includes opposite this bore a shaft which passes through the stator cover by means of a hole formed in the centre of the cover. The rotor also includes, outside the housing, a gear wheel fixed on this shaft in order to receive the rotary motion to be retarded.

With the rotation-retarder thus formed, when the rotor is rotated, the balls retained in the notches and kept in contact with the O-ring are thrust into this ring in order to brake the rotation of the rotor by the friction of contact between the balls and the O-ring.

SUMMARY OF THE INVENTION

The invention is intended to improve this type of retarder. It aims in particular to reduce the cost of manufacture of such a retarder, in particular by employing a small number of parts, which are easy to manufacture and assemble.

To this end, it proposes a rotation-retarding device including a first element and a second element having relative to each other a rotary motion to be retarded, and characterised by the fact that the first element includes a block of flexible material, the second element is able to locally deform the block of flexible material right through the rotary motion in order to retard this motion, and anti-adherence means are provided at the interface of the two elements.

The requirements just mentioned are met by such a rotation-retarding device, as it is limited to a block of flexible material in direct contact with another element and anti-adherence means at the interface of these two elements.

In fact it has surprisingly been found that the employment of anti-adherence means at the interface of a block of flexible material and another element able to deform it locally allows the required braking torque to be obtained, this being essentially due to the work of local deformation of the block of flexible material. Moreover, this device fulfils its role without any erratic or irregular operation which could be the source of locking of the element having a rotary motion in an intermediate position.

Moreover, the block of flexible material also participates in the reduction of manufacturing costs because it is not necessary for it to be formed of a piece of revolution.

To the same end, the anti-adherence means preferably result from the make-up of the block of flexible material and/or the second element. As a modification, these anti-adherence means comprise an anti-adherent coating on the block of flexible material and/or on the second element. A combination of these two types of means can be envisaged.

Also for reasons of cost, the material forming the block of flexible material is a polyolefin or a copolymer of which at least one monomer is an olefin. Preferably, the polyolefin is polyethylene or polypropylene, while the preferred copolymers are ethylene/propylene (E/P), ethylene/methacrylic acid (E/MA) and ethylene/ethyl acrylate (E/EA) copolymers.

To improve the anti-adherence characteristics, the polymer or copolymer may contain a charge of powdered lubricant, such as Teflon® or molybdenum disulphide, and/or be impregnated with a liquid lubricant, such as a silicone oil.

To increase the resistance to wear of the polymer or of the copolymer, these may also be cross-linked.

As to the anti-adherent coating, this may be formed of a Teflon® based product.

In accordance with a characteristic preferred for its simplicity and ease of use, the second element includes at least one extension permitting the local deformation of the block of flexible material.

The second element may thus:
- include two legs forming extensions and longitudinally squeezing the block of flexible material;
- include at least one leg forming an extension, in compression contact with the peripheral surface of the block of flexible material;
- include at least one leg forming an extension and engaged in a groove formed in the block of flexible material.

When the piece to be retarded is a piece turning about an axis parallel to the plane of the ground and the drive torque of which, due to gravity, consequently varies with evolution of the length of the lever arm from the centre of gravity of the piece to be retarded relative to its axis of rotation, the block of flexible material advantageously has a dimensional variation able to permit progressive retarding of the rotary motion.

This dimensional variation could correspond to a variation in length of the block of flexible material, to a variation in the distance of the peripheral surface of the block of flexible material from the axis of rotation of the device or to a variation in the width of the groove defined above.

In accordance with a preferred embodiment, the second element forms an integral part of a piece of which the rotary motion is to be retarded, while the block of flexible material is mounted on the frame on which the piece is mounted to rotate, or vice-versa.

Thus, at low cost, a retarding device is obtained formed mainly of a block of flexible material having suitable forms and of elements arising from parts of the system receiving this retarding device. Brought down to essentials, the only element added to obtain a system with a retarding device is the block of flexible material.

In other words, the retarding device thus obtained is a device integrated into the system intended to receive the retarding device, as opposed to the retarders of the state of the art, which are formed of pre-assembled units including a first element to be fixed to a static frame and a second mobile element having to be retarded.

Under a second aspect, the invention also relates to the use of a device as disclosed above to retard the rotary motion of a lid.

BRIEF DESCRIPTION OF THE DRAWINGS

The characteristics and advantages of the invention will become more apparent from the following description, given by way of example, and with reference to the attached diagrammatic drawings in which.

DETAILED DESCRIPTION OF THE INVENTION

Figure 1:
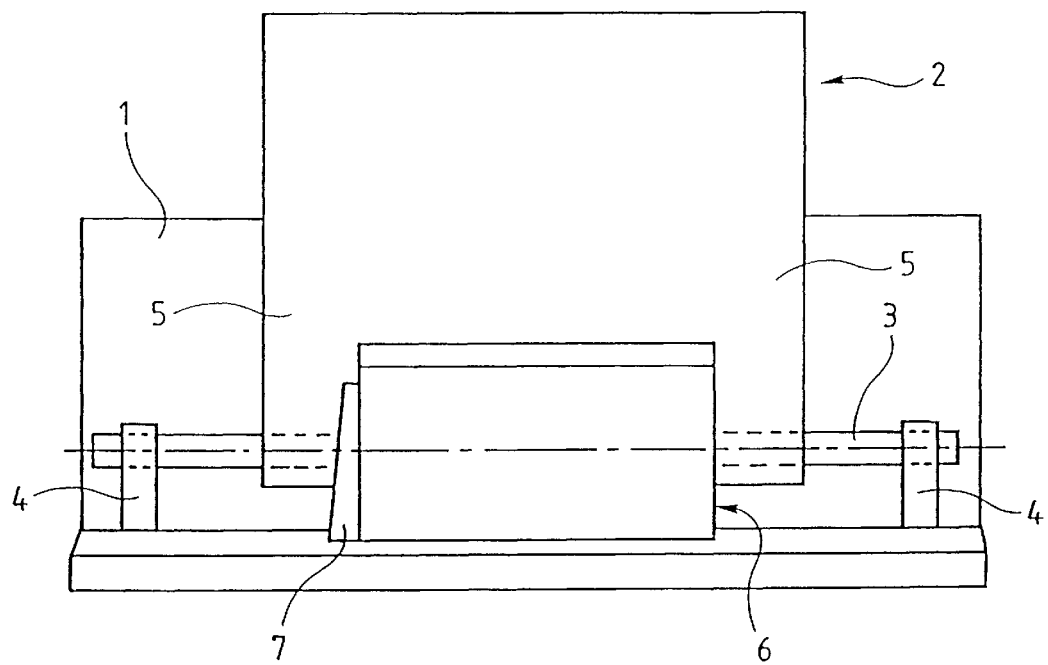
FIG. 1 is a diagrammatic frontal view of a first embodiment of a rotation-retarding device in accordance with the invention, integrated in a system including a piece to be retarded.
Figure 2:
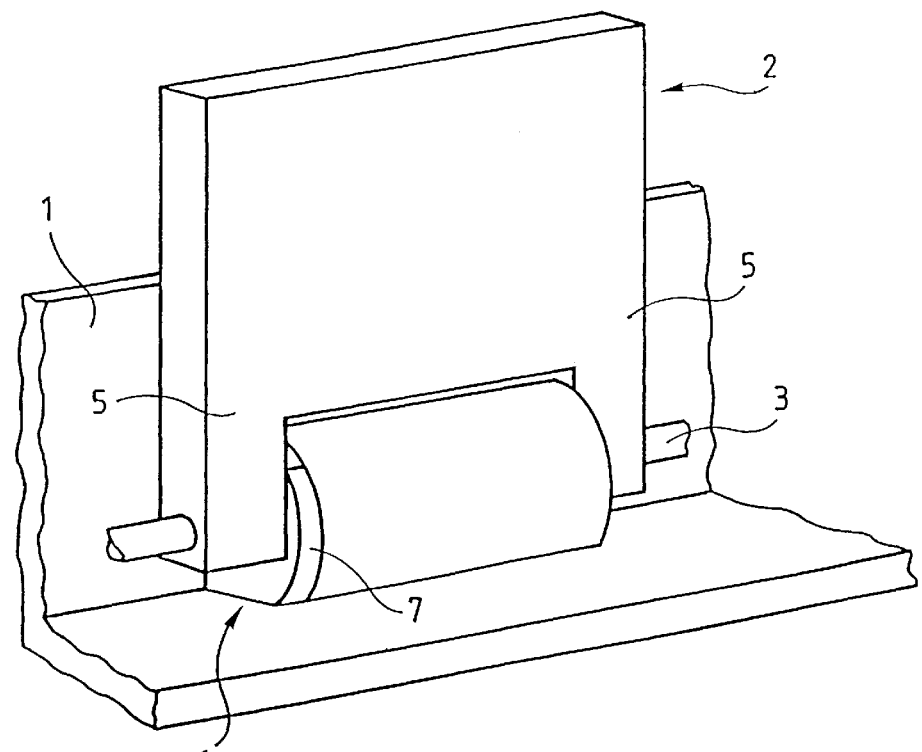
FIG. 2 is a perspective view with partial cut-aways of the system with retarding device of FIG. 1.

The system of FIGS. 1 and 2 shows diagrammatically an element forming a frame 1 on which is rotatably mounted an element forming a lid 2. The latter is mobile in rotation about a shaft 3 carried by support legs 4 fixed to the frame 1.

In accordance with the invention, to retard the rotary motion of the element forming the lid 2, this includes two legs 5 forming extensions of the closing part proper of element 2, with which they are formed in one piece.

These legs 5 serve not only to mount the rotary element 2 on the shaft 3 but also to longitudinally squeeze a block of flexible material 6 of the retarding device to deform it locally all through the rotary motion of the element forming a lid 2, in order to retard this motion.

This block of flexible material 6 includes a protuberance 7 at one of its longitudinal ends, which is so conformed that the length of the block of flexible material increases from the start of the rotary travel of the element forming a lid 2 towards the end of this travel. It is thus possible to obtain progressive retarding of the rotary motion taking account of the variation of the drive torque due to gravity.

It will also be seen that this block of flexible material 6 is passed through by the shaft 3 and, consequently, mounted on the frame 1 by means of this shaft 3. Moreover, the right section of this longitudinal block 6, with the exception of the protuberance 7, is a quarter of a circle.

Anti-adherence means are, moreover, provided at the interface of the block of flexible material 6 and the legs 5.

They result, here, from the make-up of the block of flexible material 6, which is made of cross-linked polyethylene.

As already mentioned, the anti-adherence means may, in other embodiments, for example those of FIGS. 3 and 4 which will now be described, result from the make-up of the element 2, or at least of its legs 5, or even the make-up of the two elements 1 and 2.

These anti-adherence means may moreover also be made in the form of an anti-adherent coating, for example a Teflon® based product, on the block of flexible material 6 and/or the legs 5. A combination of an anti-adherent coating on one of the elements and of a constituent material forming anti-adherence means for the other element is, of course, possible.

As has also been said, other constituent materials may also be employed. It will be recalled, in particular, that the polymers or copolymers used may contain a charge of powdered lubricant and/or be impregnated with a liquid lubricant.

As rigid material for the element intended to locally deform the block of flexible material 6, may by used for example a polyamide, a polyacetal, or rigid polypropylene. This material could contain Teflon® powder or molybdenum disulphide to obtain a constituent material forming anti-adherence means.

Figure 3:
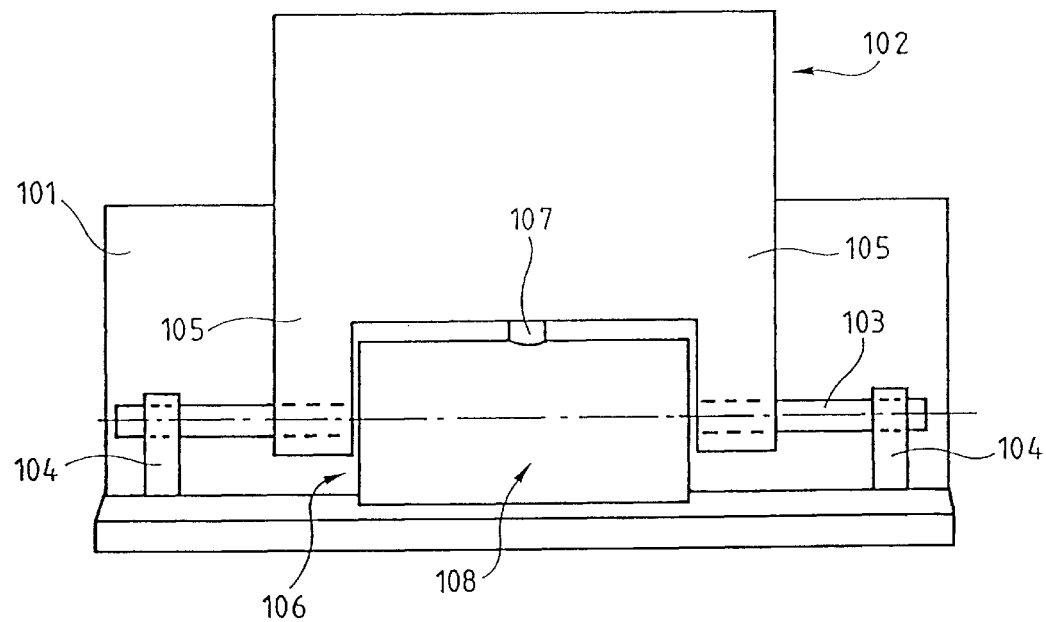
FIG. 3 is a diagrammatic frontal view of a second embodiment of a retarding device in accordance with the invention and integrated in a system including a piece to be retarded; and, FIG. 4 is a diagrammatic frontal view of a third embodiment of a rotation-retarding device in accordance with the invention and integrated in a system including a piece to be retarded.
Figure 4:
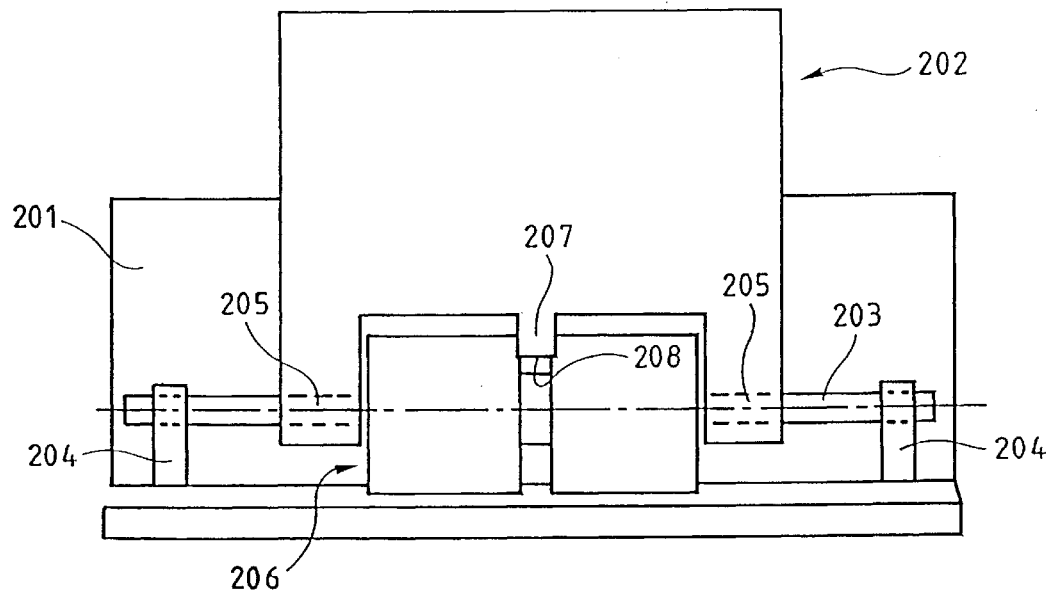

For the second and third embodiments of FIGS. 3 and 4 respectively, the same reference marks have been used as those of FIGS. 1 and 2 for identical or similar elements, to which have been added the number 100 for the second embodiment of FIG. 3 and the number 200 for the third embodiment of FIG. 4.

The embodiment of FIG. 3 differs from that of FIGS. 1 and 2 by the fact that the legs 105 of the element forming the lid 102 no longer squeeze the block of flexible material 106 longitudinally.

The local deformation of this block of flexible material 106 throughout the rotary motion of the element forming the lid 102, in order to retard this motion, is obtained by means of a leg 107 in compression contact with the peripheral surface 108 of this block of flexible material 106. Here, this leg 107 is made in one piece with the closing part proper of the element forming the cover 102 and compresses the block of flexible material 106 substantially in its middle.

Moreover, it extends parallel with the legs 105.

As for the embodiment of FIGS. 1 and 2, the block of flexible material 106 still has passing through it a shaft 103 carried by legs 104 fixed to an element forming a frame 101.

On the other hand, the dimensional variation able to permit progressive retarding of the rotary motion is no longer obtained in the case of this block of flexible material 106 by a variation in length, but by a variation in the distance of the peripheral surface 108 of this block 106 from the axis of rotation of the rotation-retarding device, defined in this case by the shaft 103.

In other words, the block of flexible material 106 has, roughly speaking, a form of a quarter of a solid cylinder of which the curved peripheral surface is partly formed by a crescent shaped swelling.

In the case of the embodiment of FIG. 4, the local deformation of the block of flexible material 206 by the element forming the lid 202, in order to retard the rotary motion of the latter, is also obtained by means of a leg 207 of the element 202 of which it forms an extension. This leg 207 is similar to the leg 107 of FIG. 3, but it is engaged in a groove 208 formed in the block of flexible material 206, substantially in the middle of this.

As shown in FIG. 4, the dimensional variation able to permit progressive retarding of the rotary motion is, here, obtained by a variation in the width of this groove 208.

For the rest, this block of flexible material 206 still has passing through it a shaft 203 carried by legs 204 fixed to a frame 201, the element forming the lid 202 also including legs 205 passed through by this shaft 203 for the rotary mounting of this element 202 on the element forming a frame 201.

It is also to be noted that the right section of the block of flexible material 206 is a quarter of a circle.

It is self-evident that numerous modifications can be made to the device described and illustrated without departing from the scope of the invention. In particular, a flexible limit of travel stop could be integrated in the block of flexible material. Disagreeable noises, such as banging, at the limit of travel are thus avoided.

What is claimed is:

1. A rotation-retarding device, comprising a frame;

a first element being attached to said frame; and a second element being rotatably supported by said frame to be moveable, along a path, relative to said first element which is adapted to retard a rotary motion of said second element along said path;

wherein said first element includes a flexible body which is in physical contact with and deformed by said second element when said second element is at a location on said path; and said second element includes a leg that describes a plane during said rotary motion, said plane cuts through an end portion of said body, said end portion having an end face slanted with respect to said plane.

2. A rotation-retarding device, comprising a flexible body; and a rotating element rotatable about said body;

wherein said body is in physical contact with and deformed by said rotating element when said rotating element rotates about said body, thereby retarding rotation of said rotating element;

said rotating element has two legs with said body being disposed between said legs; and a longitudinal extent of said body, as measured along an axis of rotation of said rotating element, is greater than a distance between said legs, as measured along said axis of rotation.

3. The device of claim 2, wherein said axis of rotation extends through said body.

4. The device of claim 2, further comprising a shaft on which said rotating element is rotatably mounted, said shaft extending through said body.

5. The device of claim 2, wherein the longitudinal extent of said body increases in a direction of rotation of said rotating element.

6. The device of claim 2, wherein an interface, where said body contacts said rotating element when said rotating element rotates about said body, includes an anti-adherent material.

* * * * *